L. FAUST & F. G. HOGLAND.
LOCK.
APPLICATION FILED AUG. 29, 1906.
Reissued June 22, 1909.
12,977.
2 SHEETS—SHEET 1.
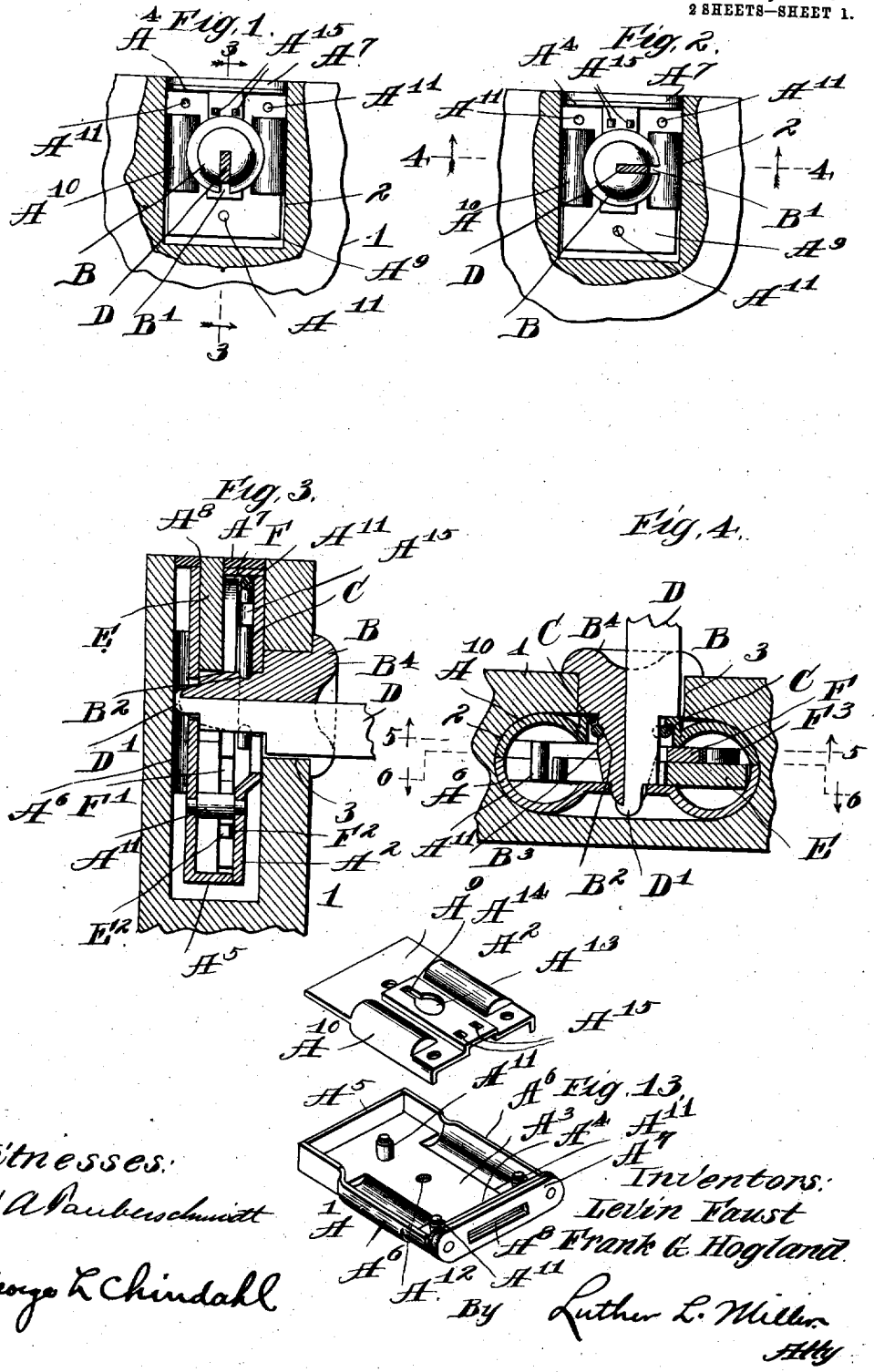
Witnesses:
G. A. Paubenschmidt
George L. Chindahl
Inventors:
Levin Faust
Frank G. Hogland
By Luther L. Miller
Atty
THE NORRIS PETERS CO., WASHINGTON, D. C.

L. FAUST & F. G. HOGLAND.

LOCK.

APPLICATION FILED AUG. 29, 1906.

Reissued June 22, 1909.

12,977.

2 SHEETS—SHEET 2.

Witnesses:

G A Paulenschmidt

George L Chindahl

Inventors:

Levin Faust

Frank G Hogland

By Luther L. Miller

Atty

THE NORRIS PETERS CO., WASHINGTON, D. C.

UNITED STATES PATENT OFFICE.

LEVIN FAUST AND FRANK G. HOGLAND, OF ROCKFORD, ILLINOIS, ASSIGNORS TO NATIONAL LOCK COMPANY, OF ROCKFORD, ILLINOIS, A CORPORATION OF ILLINOIS.

LOCK.

No. 12,977. Specification of Reissued Letters Patent. Patented June 22, 1909.

Original No. 804,835, dated November 21, 1905, Serial No. 252,089. Application for reissue filed August 29, 1906. Serial No. 332,558.

*To all whom it may concern:*

Be it known that we, LEVIN FAUST and FRANK G. HOGLAND, citizens of the United States of America, residing at Rockford, in the county of Winnebago and State of Illinois, have invented certain new and useful Improvements in Locks, of which the following is a specification.

One of the objects of this invention is the production of a lock comprising a lock casing of such form as to be readily insertible within a mortise formed within the furniture part, said lock casing having a key-guiding cylinder separable from the lock casing and adapted to be inserted within a round hole bored through the furniture part and communicating with said mortise.

Another object of this invention is the production of key-operable means for releasably securing the key-guiding cylinder in position with relation to the lock case.

A further object of the invention is to produce a lock casing especially designed to fit within the mortise as commonly formed in furniture parts.

Another object of the invention is the production of a lock casing adapted to be stamped from sheet metal and consisting of the fewest possible number of pieces.

Our invention also relates to the other improvements hereinafter described tending to the production of a strong serviceable lock of the simplest, compactest construction possible.

Figure 5:
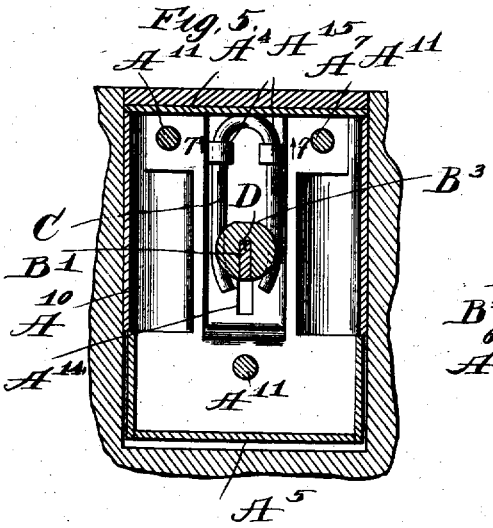
Figure 6:
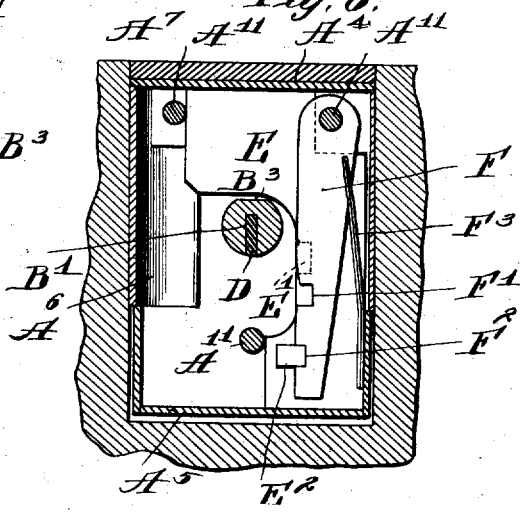
Figure 7:
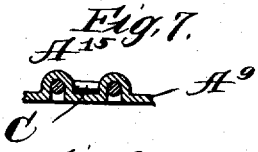
Figure 8:
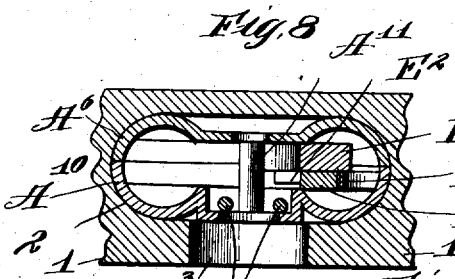
Figure 9:
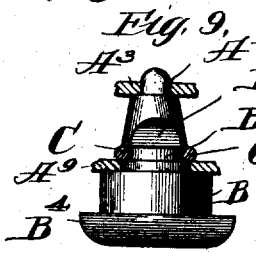
Figure 12:
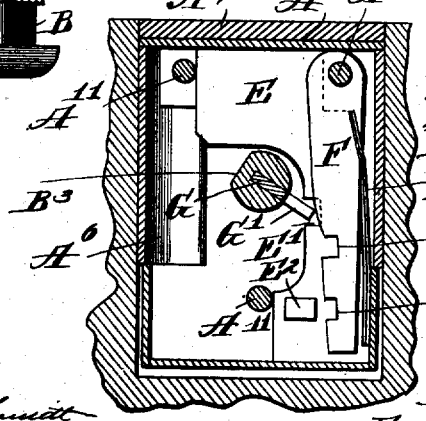
Figure 10:
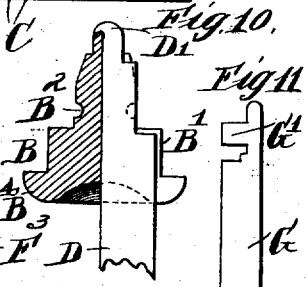
Figure 11:
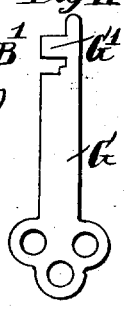

Referring to the accompanying drawings, which form a part of this specification, Figure 1 is a front view of a lock embodying our invention seated in a mortise formed in a drawer-front or other furniture part, the latter being represented as broken away to disclose the lock. Fig. 2 is a like view of the same with its master-key and key-guiding cylinder in different positions from those shown in Fig. 1. Fig. 3 is an enlarged section at the dotted line 3 3 in Fig. 1. Fig. 4 is an enlarged section at the dotted line 4 4 in Fig. 2. Fig. 5 is a section at the dotted line 5 5 in Fig. 4. Fig. 6 is a section at the dotted line 6 6 in Fig. 4. Fig. 7 is a section at the dotted line 7 7 in Fig. 5. Fig. 8 is a section at the dotted line 4 4 in Fig. 2 with the key-guiding cylinder and master key of the lock detached therefrom. Fig. 9 is a top plan view of the key-guiding cylinder of the lock, showing it operatively supported in its bearings in the lock-casing and held therein by means of a retaining-spring. Fig. 10 is a sectional detail of such key-guiding cylinder, showing the master-key operatively connected therewith just as it withdrew it from its bearings in Fig. 8. Fig. 11 is a key for operating the bolt of the lock. Fig. 12 is a section at the dotted line 6 6 in Fig. 4, showing the operating-key just engaging its locking-bolt. Fig. 13 is a perspective view of the two parts comprising the lock casing.

Like characters of reference indicate corresponding parts throughout the several views.

1 refers to a drawer-front or other furniture part, said drawer-front having a mortise 2 formed therein by boring two holes to define the ends of the mortise and clearing out the wood between said holes. An opening 3 is bored through the drawer front into the mortise 2 for a purpose to appear later herein.

The locking casing A is especially designed to fit within the mortise 2, said casing being relatively flat, and having semi-cylindrical sides fitting within the semi-cylindrical sides of the mortise, as shown in Figs. 4, 8 and 13. The lock casing A, in this instance, consists of two sections $A^1$ and $A^2$ formed from sheet metal. The casing-section $A^1$ comprises the back wall $A^3$, the top wall $A^4$, the bottom wall $A^5$ and the two partial side walls $A^6$, said side walls being curved as indicated in Figs. 4 and 13. To the upper face of the top wall $A^4$ is fixed the face-plate $A^7$, the bolt-opening $A^8$ being formed in said top wall and said face-plate for the passage of a bolt to be hereinafter described. The casing-section $A^2$ comprises the front wall $A^9$ and the partial side walls $A^{10}$ adapted to complement the partial side walls $A^6$ of the casing-section $A^1$ to form rounded side walls for the lock casing. The casing-sections $A^1$ and $A^2$ are secured together, in this instance, by means of shouldered posts $A^{11}$ which have their ends headed down, as shown. In the back wall $A^3$ of the casing-section $A^1$ is formed a bearing opening $A^{12}$, and in the front wall $A^9$ of the casing-section $A^2$ is formed a bearing opening $A^{13}$ axially alined with said first mentioned bearing opening. In the casing-section $A^2$ is also formed a key-hole $A^{14}$.

B is a key-guiding-cylinder (Fig. 9) having a radial keyhole $B^1$ therein registrable with the keyhole $A^{14}$ in the lock-case A and provided with an annular peripheral groove $B^2$, having the side thereof opposite to and farthest from such keyhole $B^1$ cut away, as at $B^3$, and furnished at its outer end with an annularly-flanged escutcheon $B^4$, said cylinder being rotatably mounted in the bearings $A^{12}$ $A^{13}$ in the lock-case A.

C is a bifurcated spring secured to the lock-case, in this instance, by means of loops $A^{15}$ punched from the wall $A^9$ of said lock-case, said spring bestriding the key-guiding cylinder B and engaging the peripheral annular groove $B^2$ therein, and thereby serving to maintain such cylinder against endwise movement in its bearings $A^{12}$ $A^{13}$ in the lock-case.

D is a master-key (Fig. 4) of sufficient width to engage and throw either bifurcation of the spring C clear out of the groove $B^2$ in the key-guiding cylinder B. Said key is provided at its point with a hook $D^1$ for engaging the inner end of such cylinder and withdrawing it from the lock-case. When the key D and the cylinder B are turned into such position that said key can engage one of the legs of the spring C, the flattened portion $B^3$ of said cylinder lies adjacent to the other leg of said spring, permitting the removal of the cylinder B by a pull exerted upon the key D.

E (Figs. 6 and 12) is a bolt having an actuating-slot $E^1$ in one edge thereof and a transverse detent $E^2$ thereon, said bolt being slidably mounted in the lock-case and adapted to be projected through the opening $A^8$ in said lock-case.

F is a tumbler having detent-slots $F^1$ $F^2$ therein adapted to be engaged by the detent $E^2$ on the bolt E, said tumbler being pivoted by the end thereof farthest from the detent-slots $F^1$ $F^2$ to one of the posts $A^{11}$ of the lock-case and being provided with a spring $F^3$ which normally maintains either of the detent-slots $F^1$ $F^2$ in engagement with the detent $E^2$ on the bolt E.

G (Fig. 11) is a key provided with a bit $G^1$ for operating the bolt E of the lock.

In use, the lock with the key-guiding-cylinder B removed therefrom is inserted into the mortise 2 until the face-plate $A^7$ is flush with the edge of the drawer or other part in which the mortise is formed, the lock-case A fitting snugly within the mortise, as shown in Figs. 4 and 8. The key-guiding-cylinder B is then inserted through the opening 3 into its bearings $A^{12}$ $A^{13}$ in the lock-case, whereupon the legs of the spring C will engage the peripheral annular groove $B^2$ in said cylinder and lock such cylinder securely against endwise movement, while leaving it free to be rotated by the master-key D and operating-key G. Whenever it is desirable or necessary to remove the lock from its mortise, the master-key D is inserted into the keyhole $B^1$ in the cylinder B (Fig. 3) and given a quarter-turn, throwing the contiguous leg of the spring C clear out of the groove $B^2$ in the cylinder B, the rotation of said cylinder bringing the cut-away portion $B^3$ thereon opposite the other leg of said spring, thereby leaving the cylinder B free to be withdrawn outward from its bearings in the lock-case by means of the hook $D^1$ on the master-key D (Figs. 8 and 10). The employment of the annular escutcheon flange $B^4$ on the cylinder B obviously renders it unnecessary to accurately fit the opening 3 to said cylinder.

We claim as our invention:

1. A flat casing for mortise locks, relatively thin from front to back, comprising an integral section consisting of a back wall, a complete bottom wall, a complete top wall, and two partial curved side walls, and an integral section consisting of a front wall and two partial curved side walls, the complete side walls being substantially semicylindrical, each of said sections being a sheet-metal stamping.

2. In a lock, in combination, a lock case, and a key-guiding cylinder rotatably connected with said lock case and readily disengagable therefrom by direct engagement with a key inserted in said cylinder.

3. In a lock, in combination, a lock case, a key-guiding cylinder rotatably mounted in said lock case; and a member in said lock case, operable directly by a key, through the key-hole in said cylinder, said member engaging said cylinder for releasably retaining said cylinder in position with relation to said lock case.

4. In a lock, in combination, a key-guiding cylinder, a lock case adapted to receive said cylinder, said cylinder having a peripheral groove therein; and a directly key-operable spring in said lock case adapted to lie in said peripheral groove.

5. In a lock, in combination, a key-guiding cylinder; a lock case adapted to receive said cylinder, said cylinder having a peripheral groove; and a bifurcated spring fixed with relation to the lock case, and bestriding the cylinder and engaging said peripheral groove.

6. In a lock, in combination, a lock-case having opposite concentric key-guiding cylinder bearings and a key-hole therein, a key-guiding cylinder, mounted in such bearings and having a radial keyhole, registrable with the keyhole in such case, and provided with a peripheral annular groove, and a bifurcated spring fast to the case and bestriding the cylinder and engaging the peripheral annular groove therein, to maintain such cylinder, against endwise movement, in its bearings.

7. In a lock, in combination, a case furnished with key-guiding cylinder bearings and a keyhole, a key-guiding cylinder mounted in such bearings and having a radial keyhole, registrable with the keyhole in such case, and provided with a peripheral annular groove, having the side thereof, opposite to and farthest from such keyhole, cut away, and a bifurcated spring fast to the case and bestriding the cylinder and engaging the peripheral annular groove therein, to normally maintain such cylinder, against endwise movement, in its bearings.

8. In a lock, in combination, a case having bearings therein and provided with a radial keyhole extending from the perimeter of one of said bearings, a key-guiding cylinder having a radial keyhole therein, registrable with the keyhole in the case, and provided with a peripheral groove having the side thereof opposite to and farthest from such last-mentioned keyhole cut away, and rotatably mounted in the bearings in the lock-case, and a bifurcated spring made fast to the lock-case by means of loops therein, and bestriding the key-guiding cylinder and engaging the peripheral annular groove therein, thereby serving to maintain such cylinder against endwise movement in its bearings in the lock-case.

9. In a lock, in combination, a case furnished with key-guiding cylinder bearings and a keyhole extending radially from the perimeter of one of such bearings, a key-guiding cylinder, rotatably mounted in such bearings and having a radial keyhole, registrable with the keyhole in such case, and provided with a peripheral annular groove having the side thereof opposite to and farthest from such keyhole cut away, and a bifurcated spring bestriding the cylinder and engaging the peripheral annular groove therein, to maintain such cylinder, against endwise movement in its bearings in the case, a master-key of sufficient width, when turned, to engage and throw either furcation of the spring clear out of the groove in the cylinder, and provided, at its point, with a hook for engaging the inner end of such cylinder and withdrawing it from the lock-case.

LEVIN FAUST.
FRANK G. HOGLAND.

Witnesses:
NELLIE E. ENNETT,
BURTON W. NORTON.